UNITED STATES PATENT OFFICE.

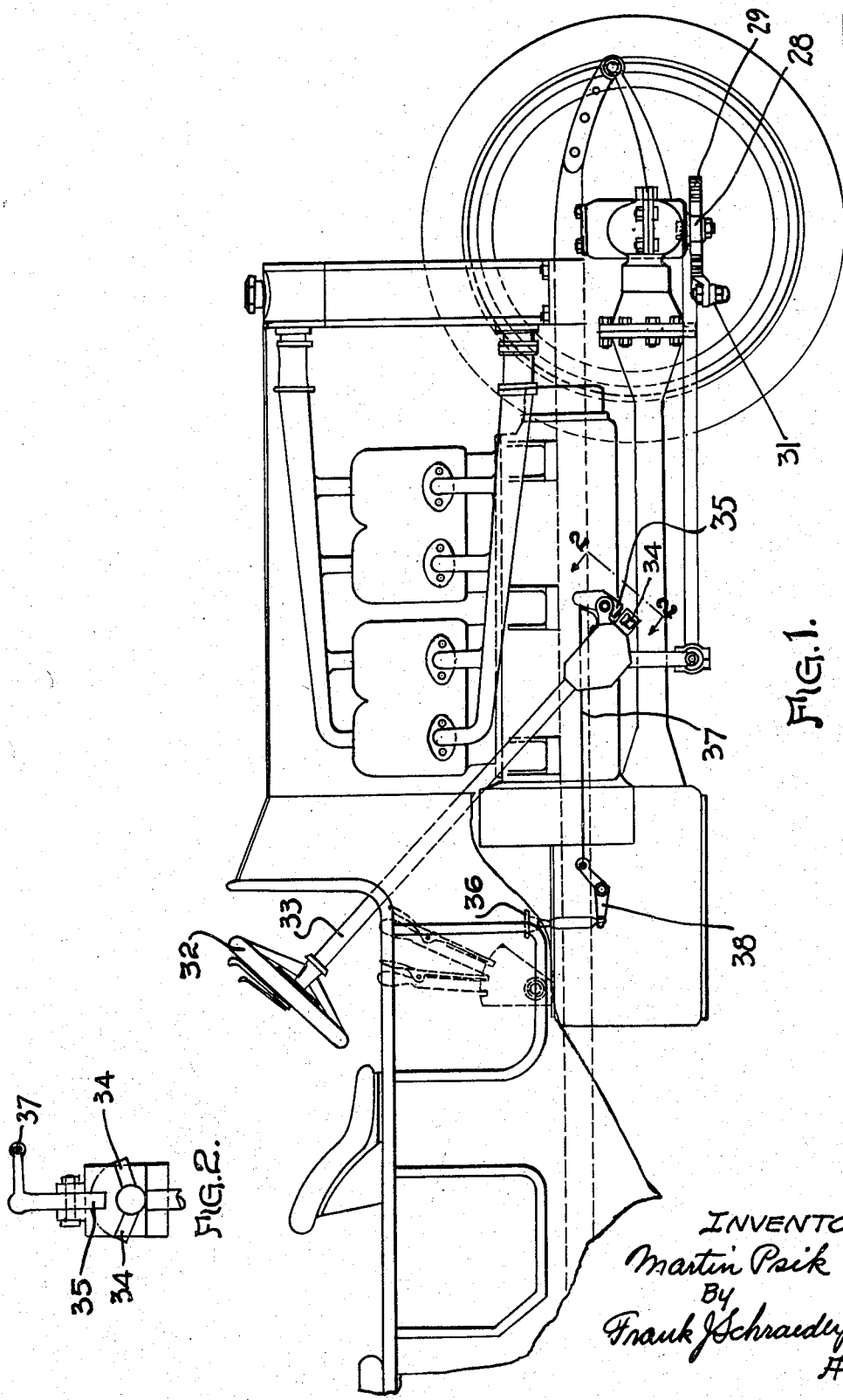

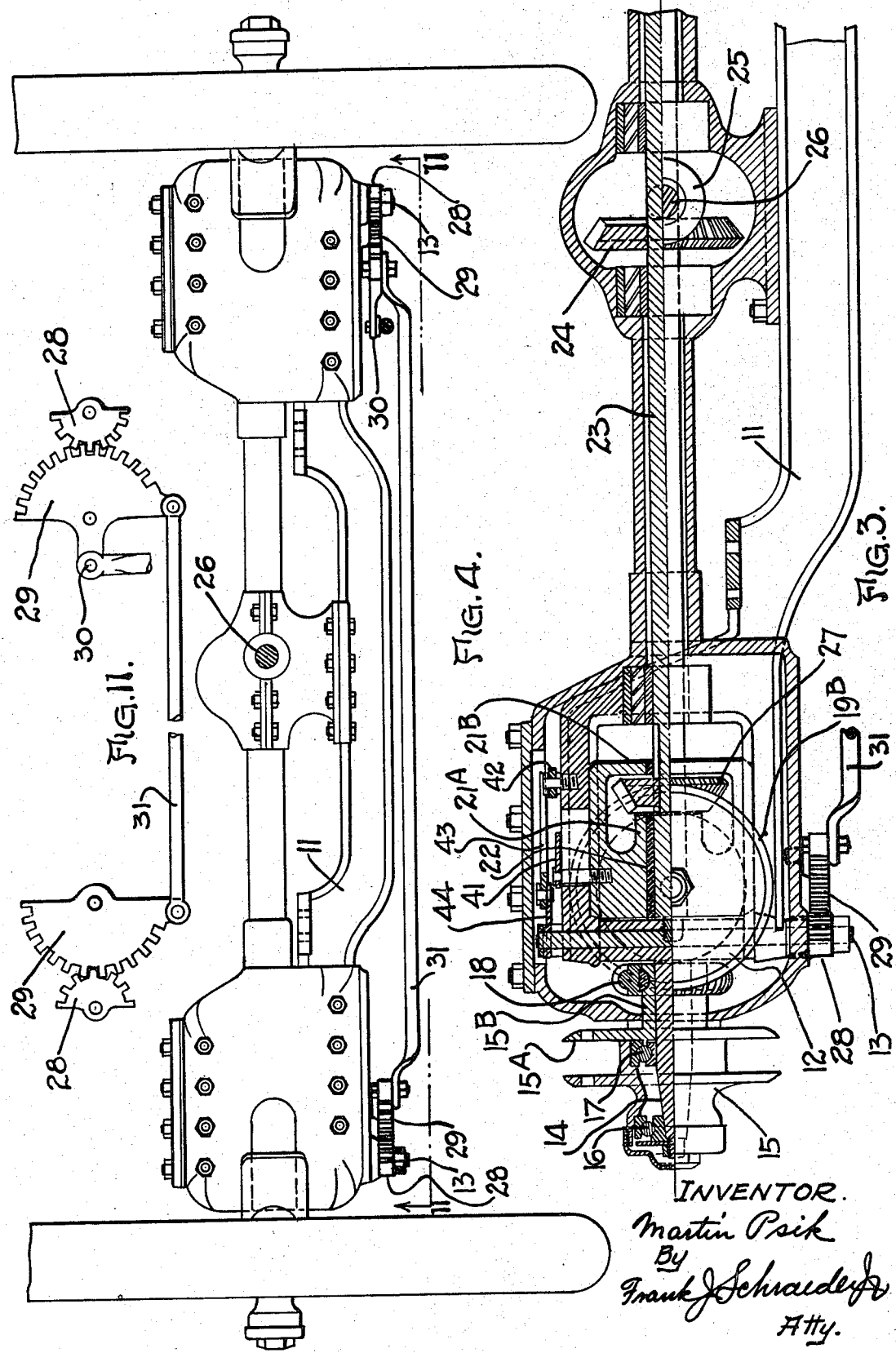

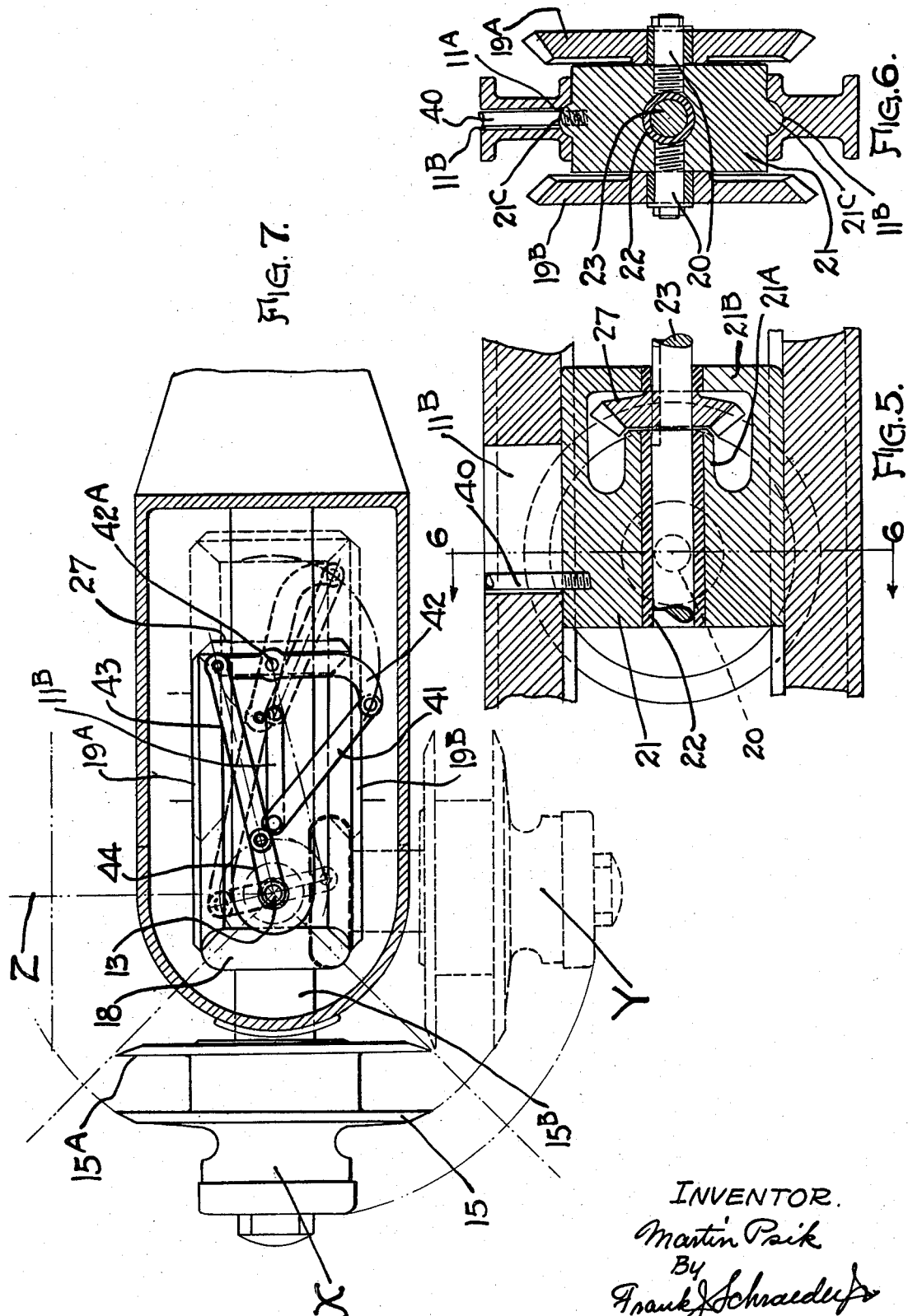

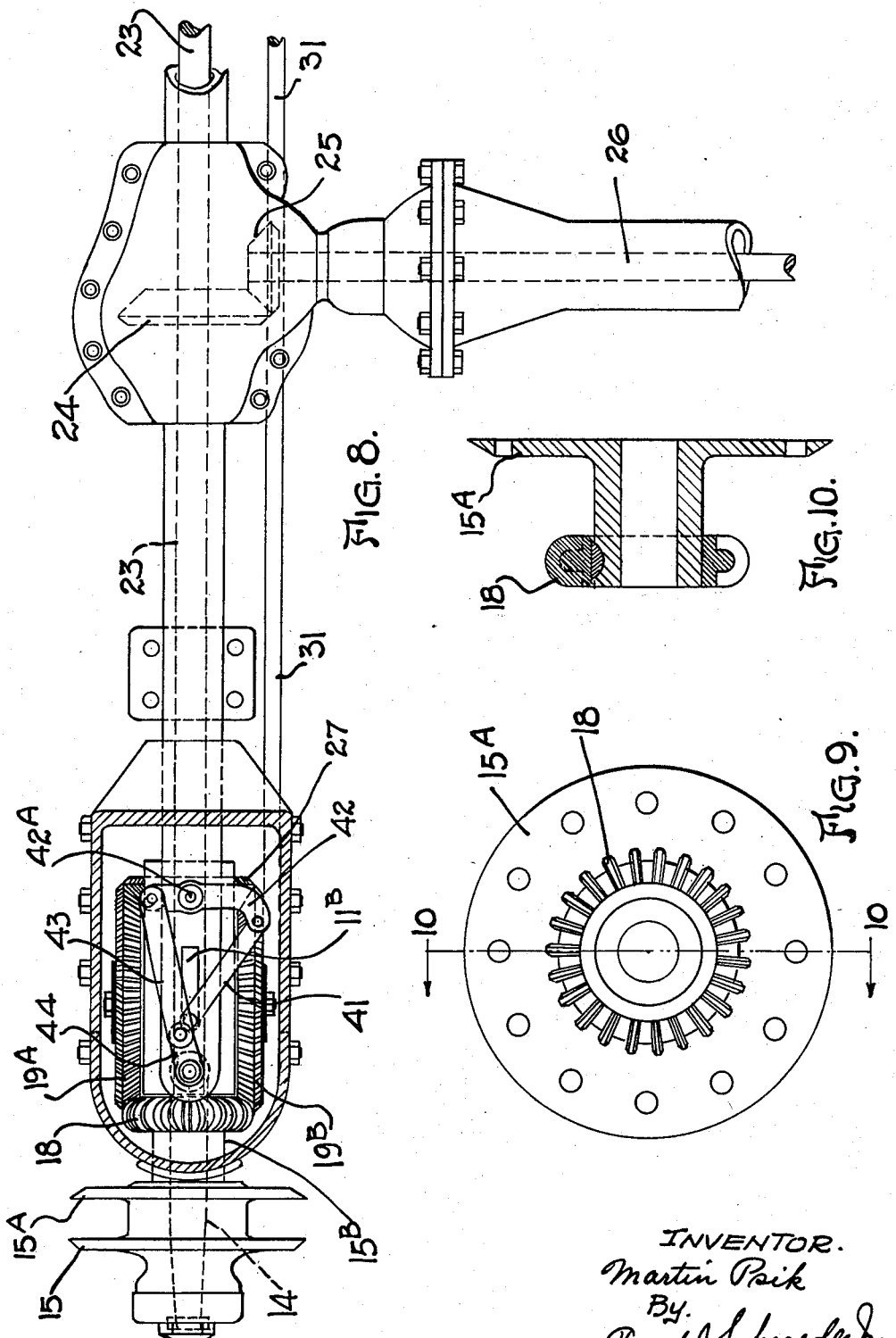

MARTIN PSIK, OF CHICAGO, ILLINOIS.

AUTOMOBILE STEERING MECHANISM.

1,299,025.     Specification of Letters Patent.     Patented Apr. 1, 1919.

Application filed August 25, 1916. Serial No. 116,656.

*To all whom it may concern:*

Be it known that I, MARTIN PSIK, a citizen of the United States, residing at Chicago, in the county of Cook and State of Illinois, have invented certain new and useful Improvements in Automobile Steering Mechanism, of which the following is a specification.

My invention has relation to steering mechanism for automobiles and has particular reference to a novel and efficient mechanism whereby the steering wheels may be turned through an angle of ninety degrees on either side of their supporting knuckles.

It is also an object of this invention to produce combined driving and steering wheels which will afford the practical utilization of turning the automobile with the steering wheels at an angle of ninety degrees or at right angles to the longitudinal center line of car. That is, my invention includes the novel transmission mechanism for applying power directly to the steering wheel continuously during the angular movement of the wheel.

The advantages of this invention will be appreciated in the short turns afforded on the crowded street of the city, the narrow country road or in the garage filled with obstructions.

With these and other objects in view my invention consists in the novel combination, construction, association, and relative position of parts and members set forth in the following specification, and particularly pointed out in the appended claims.

Referring to the drawings in which like reference characters indicate like or corresponding parts:

Figure 1 is an illustration of a part interior elevation of an automobile showing an application of my invention. Fig. 2 is view taken on line 2—2 of Fig. 1 showing a safety device for limiting the turning movement of the steering wheels. Fig. 3 is a part section and elevation of my combined steering and driving mechanism and Fig. 4 illustrates an exterior elevation of the casing inclosing the operating machinery. Fig. 5 illustrates an enlarged detail of the sliding block for maintaining the driving gears in constant spaced relation. Fig. 6 is a section through the sliding block and gears taken on line 6—6 of Fig. 5. Fig. 7 illustrates two positions of the mechanism for controlling the movement of the sliding block and driving gears. Fig. 8 is a general view of the usual connection of the main longitudinal drive shaft with the cross drive shaft. Fig. 9 is an elevation of the flanged wheel hub and mounted gear and Fig. 10, a cross section thereof taken on line 10—10 of Fig. 9. Fig. 11, illustrates a plan view of the interconnected gear segments for operating the steering knuckles.

In the illustrations 11 indicates a channel-section steel frame supporting the pivoted knuckles 12 which are rigidly mounted on the vertical pin 13 and which support the stub axle 14 upon which is rotatably mounted the flanged wheel hub 15 with ball-bearings 16 and 17. The complementary flange section $15^A$ is cast with a horizontally disposed hub portion $15^B$ to which is keyed or otherwise rigidly secured, the wheel drive gear 18 which has constant engagement with both or either one of the drive gears $19^A$ and $19^B$. Both drive gears $19^A$ and $19^B$ are loosely mounted on the stub pins 20 which are screw mounted within sliding block 21 and which sliding block 21 is provided with a bronze bushing 22 and has horizontal movement upon the cross drive shaft 23 which receives power through the usual gear 24 and pinion 25 keyed to the main longitudinal power shaft 26. The cross drive shaft 23, gear 24, pinion 25 and main shaft 26 are all inclosed and supported on roller bearings in any well known manner.

Between the hub portion $21^A$ of the sliding block 21 and the extended back $21^B$ I provide the drive pinion 27 rigidly keyed to the cross drive shaft 23. It is obvious that by such arrangement the pinion 27 is confined to and maintained in constant engagement and relative position to the drive gears $19^A$ and $19^B$ for rotating same in opposite directions during the revolution of the cross drive shaft 23.

Both steering knuckles are provided at the bottom thereof with a pair of cast steel opposite coacting gear segments 28 and 29 which afford a 180° rotation of the steering wheels with a relatively smaller movement of the steering arm 30 and drag link 31 connecting the segmental gears 29.

As a means of safety, and to overcome any possibility of the wheels being turned suddenly 90° or at right angles to the length of the car while running I provide means for normally limiting the turning motion of the steering wheel 32 and steering column 33 which comprises a pair of angularly disposed steel lugs 34 adapted for normally engaging the pivoted limit lever 35 and thus preventing any further rotation of steering column 33 than would rotate the steering wheels 45° to 60° or any other desired angle. When, however, the car is standing still in a limited field of movement and it is desired to rotate the steering wheels to their maximum angle for making a short turn the foot release 36 may be depressed to raise the limit lever 35 into clear by means of connecting rod 37 and rocker arm 38 and thus permit free rotation of steering column 33. See Figs. 1 and 2.

Any suitable link and lever mechanism or the equivalent thereof, may be provided for constantly retaining the wheel drivegear 18 in engagement with both or either one of the drive gears 19ᴬ and 19ᴮ which are carried by the movable block 21 which slides within the forked ends of the steel frame 11 with the segmental cast ridges 21ᶜ guided by grooves 11ᴬ and 11ᴮ. See Figs. 5 and 6. I prefer to show in this particular application a mechanism comprising a pin 40 rigid in the top of the sliding block 21 and extending through the slot 11ᴮ for pivotal engagement with a link 41 which connects with the curved end of the lever 42 pivotally mounted at 42ᴬ the other end of which is also pivotally connected by link 43 to the end of the arm 44 which arm is rigidly connected to the top of the knuckle pin 13 and therefore has angular movement corresponding to that of the wheel drive-gear 18.

From the illustrations and particularly Fig. 7 it will be observed that when the wheel is rotated 90° from the position X to position Y, the arm 44, links 41 and 43 and lever 42 will assume the positions shown in heavy dotted lines and that the sliding block 21 will be proportionally moved to maintain one of the drive gears 19ᴮ in constant spaced relation and engagement with the wheel drive gear 18. It is obvious then, that in the rotation of the wheel from position X to Z that the arm 44 will assume position to that shown by the lighter dotted line while the other members will be moved to positions indicated by the center lines and that the wheel drive gear 18 will be constantly driven by the drive gear 19ᴬ during such motion.

The casings inclosing the machinery may be of any suitable form and design.

It is thought the foregoing description together with the illustrations clearly disclose the invention, hence a more extended explanation is omitted.

I claim:

1. In an automobile steering mechanism, means for transmitting propelling power to the steering wheel continuously during the angular movement thereof, embracing in combination, a power driven shaft, pivotally mounted steering wheels, a gear rigid with each wheel, a pair of slidably mounted bevel gears at each end of said shaft, one or both of same continuously engaging said gear rigid with the wheel, a bevel pinion slidably mounted at each end of said shaft, rotated by said shaft, and maintained in fixed relative position to said bevel gears for transmitting power thereto.

2. In an automobile steering mechanism, means for continuously transmitting propelling power to the steering wheel during the pivotal angular movement of same, including in combination, a power driven shaft, pivotally mounted steering wheels, a slidable block at each end of said shaft, a pair of bevel gears mounted on said block, a bevel pinion slidably mounted at each end of said shaft, rotated by said shaft and maintained in fixed relative position to said bevel gears for transmitting power thereto, and a gear rigidly connected with each wheel and propelled by both or either one of said bevel gears.

3. In an automobile steering mechanism, means for continuously transmitting propelling power to the steering wheel during the pivotal angular movement of same, including in combination, a power driven shaft, pivotally mounted steering wheels, a slidable block at each end of said shaft, a pair of bevel gears mounted on said block, a bevel pinion slidably mounted at each end of said shaft, rotated by said shaft and maintained in fixed relative position to said bevel gears for transmitting power thereto, and a gear rigidly connected with each wheel, and means for constantly maintaining said gear mounted on each wheel in engagement with both or either one of said bevel gears.

4. In an automobile steering mechanism, the combination with a power driven cross drive shaft, of a bevel pinion slidably mounted at each end of said shaft, a slideable block movable with each bevel pinion, a pair of oppositely rotatable bevel gears carried by said block and constantly engaging said bevel pinion, a frame, steering knuckles pivotally mounted on said frame, wheels mounted on said knuckles, a drive gear rigid with each wheel, and means for maintaining one or both of said gears in constant engagement with said gear rigid with each wheel.

5. In an automobile steering mechanism, means for transmitting propelling power to the steering wheel continuously during the angular movement thereof, embracing in combination, a power driven shaft, pivotally mounted steering wheels, a gear rigid with each wheel, a pair of movably mounted bevel gears at each end of said shaft, one or both of same continuously engaging said gear rigid with the wheel, a bevel pinion slidably mounted at each end of said shaft, rotated by said shaft, and maintained in fixed relative position to said bevel gears for transmitting power thereto.

In witness whereof I have hereunto subscribed my name this 18th day of July, 1916.

MARTIN PSIK.